United States Patent
Tadaki

(10) Patent No.: US 7,567,292 B2
(45) Date of Patent: Jul. 28, 2009

(54) PORTABLE TERMINAL DEVICE AND METHOD AND PROGRAM FOR VARYING LIGHT ILLUMINANCE USED THEREIN

(75) Inventor: Takashi Tadaki, Tokyo (JP)

(73) Assignee: NEC Corporation, Tokyo (JP)

( * ) Notice: Subject to any disclaimer, the term of this patent is extended or adjusted under 35 U.S.C. 154(b) by 870 days.

(21) Appl. No.: 10/797,034

(22) Filed: Mar. 11, 2004

(65) Prior Publication Data
US 2004/0179134 A1   Sep. 16, 2004

(30) Foreign Application Priority Data
Mar. 12, 2003   (JP) .............................. 2003-065861

(51) Int. Cl.
H04N 5/222   (2006.01)
H04N 5/262   (2006.01)

(52) U.S. Cl. .................... 348/370; 348/371; 348/240.99

(58) Field of Classification Search ................. 348/370, 348/371, 240.1, 240.2, 240.3, 240.99; 396/155, 396/157, 159, 166, 175
See application file for complete search history.

(56) References Cited

U.S. PATENT DOCUMENTS

| | | | |
|---|---|---|---|
| 4,535,758 A | 8/1985 | Longacre, Jr. | |
| 4,712,902 A | 12/1987 | Hosomizu et al. | |
| 4,816,855 A | 3/1989 | Kitaura et al. | |
| 5,121,155 A | 6/1992 | O'Such et al. | |
| 5,708,860 A * | 1/1998 | Nonaka et al. | 396/28 |
| 6,327,434 B1 * | 12/2001 | Okumura et al. | 396/62 |
| 7,164,446 B2 * | 1/2007 | Konishi | 348/370 |
| 7,167,202 B2 * | 1/2007 | Ojima | 348/348 |
| 2002/0101533 A1 | 8/2002 | Liu | |
| 2003/0036365 A1 * | 2/2003 | Kuroda | 455/90 |
| 2003/0122957 A1 * | 7/2003 | Emme | 348/370 |
| 2003/0137597 A1 * | 7/2003 | Sakamoto et al. | 348/371 |
| 2005/0253923 A1 * | 11/2005 | Komori et al. | 348/14.02 |

FOREIGN PATENT DOCUMENTS

| | | |
|---|---|---|
| EP | 1 211 869 | 6/2002 |
| JP | 05-207406 | 8/1993 |
| JP | 09-304034 | 11/1997 |
| JP | 9 304034 | 11/1997 |
| JP | 2002-374331 | 12/2002 |

* cited by examiner

Primary Examiner—David L Ometz
Assistant Examiner—Luong T Nguyen
(74) Attorney, Agent, or Firm—Young & Thompson

(57) ABSTRACT

An image control processing section sends a zoom control information of a camera section, and carries out image processing. A camera control section controls the camera section on the basis of the zoom information. A zoom ratio is changeable in the camera section. A light control section varies light illuminance on the basis of the zoom information and the image processing information. A light section can emit light with arbitrary illuminance. The image control processing section sends the zoom information to the light control section, simultaneously with sending the zoom information to the camera control section. The image control processing section sends the image processing information including shades and outlines of an image and digital zoom information to the light control section. These pieces of information are used for controlling the light illuminance in stages in the light control section to make the light illuminance appropriate to photography conditions.

13 Claims, 5 Drawing Sheets

PORTABLE TERMINAL DEVICE AND METHOD AND PROGRAM FOR VARYING LIGHT ILLUMINANCE USED THEREIN

BACKGROUND OF THE INVENTION

1. Field of the Invention

The present invention relates to a portable terminal device, and a method and program for varying light illuminance used therein. In particular, the present invention relates to a method for varying the light illuminance in a camera function used in the portable terminal device.

2. Description of the Related Art

Recently, a portable terminal device has been made multi-functional, and the terminals with a musical reproduction function, a camera function or the like are commercially available. A user can take only underexposed images by a miniature camera used in the portable terminal device without a light function, and the thus obtained still or moving images may be dark in photography or picture phone.

Thus, the light is highly important as a photography auxiliary function in the portable terminal device. A flash lamp is fixedly or detachably attached to make flash photography possible (refer to, for example, Japanese Patent Laid-Open Publication No. 2002-374331 (pages 9 to 13 and FIG. 2)).

An extremely miniature camera is used in the portable terminal device as the camera function by reason of its structure. In shooting still or moving images by the miniature camera, the light has become highly important factor as a photography illumination function to make the images clearer. A white LED (Light Emitting Diode) or the like is used as an auxiliary light source for photography in the portable terminal device.

At present, the illuminance of the light of the portable terminal device for photography illumination is constant irrespective of distance from the device to an object to be photographed. There is the function of manually varying the illuminance in stages during photography in dark conditions, but the structure of the function is not related to the distance from the device to the object.

The majority of camera-equipped portable terminal devices used at present have a light for illumination at constant illuminance. Some portable terminal devices have an illuminance value variable light (for example, in five stages or the like). The illuminance value variable light, however, is assumed as an auxiliary function for photography in dark conditions, so that a user himself/herself has to decide and adjust the illuminance before or during photography.

Some of the conventional camera-equipped portable terminal devices described above further have a zoom function. In this case, however, the light as the photography auxiliary function does not have an (automatic) illuminance variable function which takes the distance from the device to the object into consideration.

SUMMARY OF THE INVENTION

An object of the present invention is to provide a portable terminal device which makes light illuminance appropriate to photography conditions, and to provide a method and program for varying the light illuminance used therein.

A portable terminal device according to the present invention comprises a camera module; a light module as an illumination function in shooting an image by the camera module; an image control processing section for sending zoom control information of the camera module and carrying out image processing; and an illuminance variable section for varying illuminance of the light module in accordance with a distance from the camera module to an object.

A method for varying light illuminance according to the present invention is applicable in a portable terminal device, which includes a camera module, a light module as an illumination function in shooting an image by the camera module, and an image control processing section for sending zoom control information of the camera module and carrying out image processing. The method for varying the light illuminance comprises an illuminance variable step for varying illuminance of the light module in accordance with a distance from the camera module to an object.

A program for varying light illuminance according to the present invention is applicable in a portable terminal device, which includes a camera module, a light module as an illumination function in shooting an image by the camera module, and image control processing section for sending zoom control information of the camera module and carrying out image processing. The program makes a computer carry out processing, which varies illuminance of the light module in accordance with a distance from the camera module to an object.

Namely, the feature of the portable terminal device according to the present invention is to control the light module as the photography illumination function by use of the information and the like to the attached camera module, in order to automatically vary the illuminance of the light module in accordance with the distance from the camera module to the object.

Therefore, the portable terminal device according to the present invention can automatically vary the illuminance of the light module in accordance with the photography distance from the camera module to the object even in a bright location, in addition to the control of the light module in a dark location. By controlling the illuminance on the basis of two factors of a zoom value sent to the camera module and an image processing value, an error in the variation of the illuminance in accordance with the zoom value is corrected, so that it is possible for a user to make the illuminance of the light module appropriate to the photography conditions.

DETAILED DESCRIPTION OF THE PREFERRED EMBODIMENT

Figure 1:
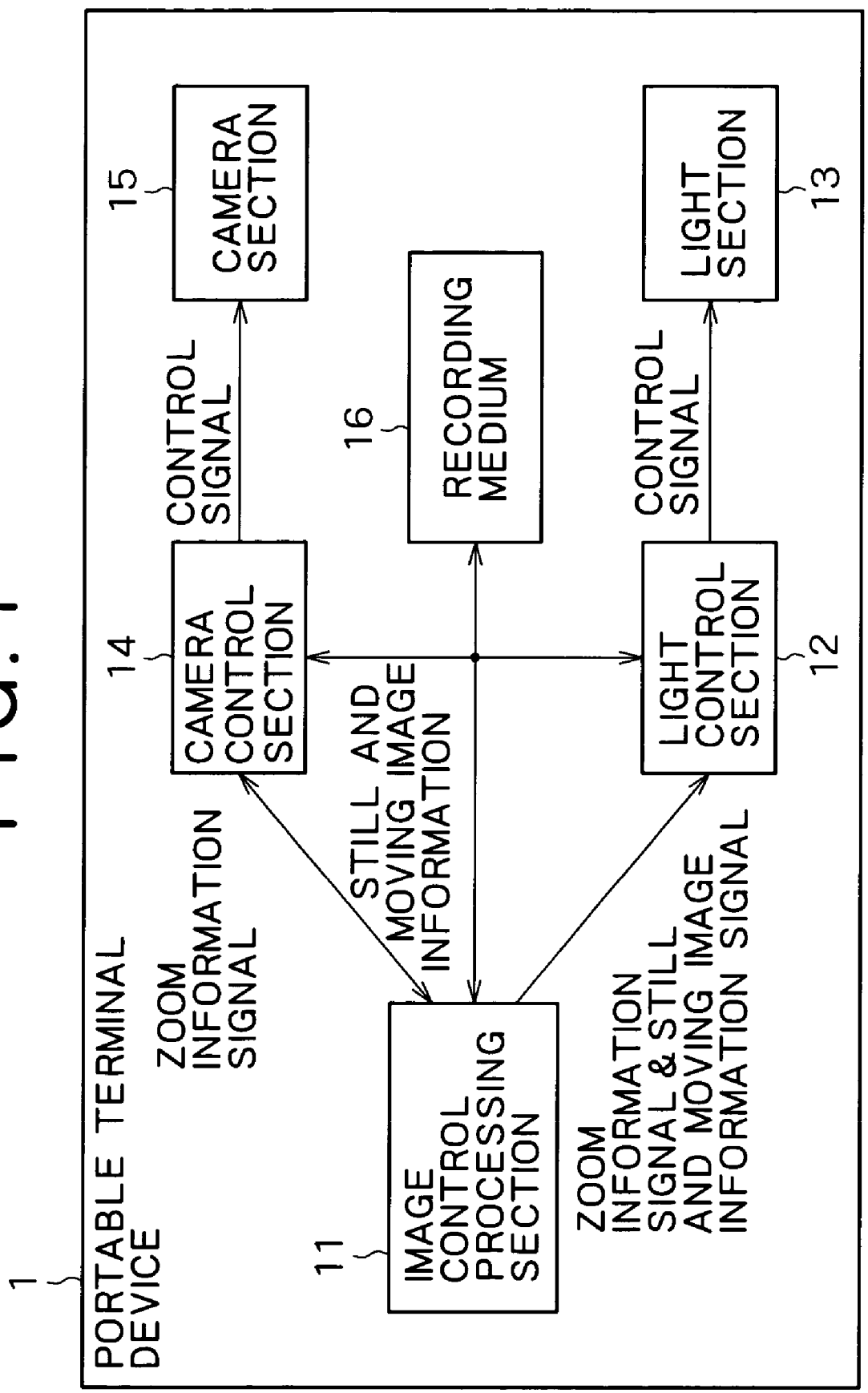
FIG. 1 is a block diagram showing the structure of a portable terminal device according to an embodiment of the present invention.

An embodiment of the present invention will be described with reference to the accompanying drawings. FIG. 1 is a block diagram showing the structure of a portable terminal device according to the embodiment of the present invention. Referring to FIG. 1, a portable terminal device 1 comprises an image control processing section 11, a light control section 12, a light section 13, a camera control section 14, a camera section 15, and a recording medium 16.

The other processing sections of the portable terminal device 1, for example, a sound input-output section and a radio communication section in the case of a cellular phone terminal, a monitor and a computer section in the case of a PDA (Personal Digital Assistant) or the like are not directly related to the present invention, so that description about the structure and operation thereof is omitted.

The image control processing section 11 sends the zoom control information of the camera section 15, and carries out image processing. The camera control section 14 controls the camera section 15 on the basis of the zoom information. A zoom ratio is changeable in the camera section 15.

The light control section 12 varies light illuminance on the basis of the zoom information and image processing information. The light section 13 can emit light with arbitrary illuminance. The recording medium 16 stores a program (program executable in a computer) to make the image control processing section 11, the light control section 12, and the camera control section 14 carry out control operation.

The image control processing section 11 sends the zoom information (optical zoom) to the light control section 12, simultaneously with sending the zoom information (optical zoom) to the camera control section 14. Moreover, the image control processing section 11 sends the image processing information, including digital zoom information and shades and outlines of an image, to the light control section 12. These types of information are used for controlling the light illuminance in stages in the light control section 12.

Figure 2:
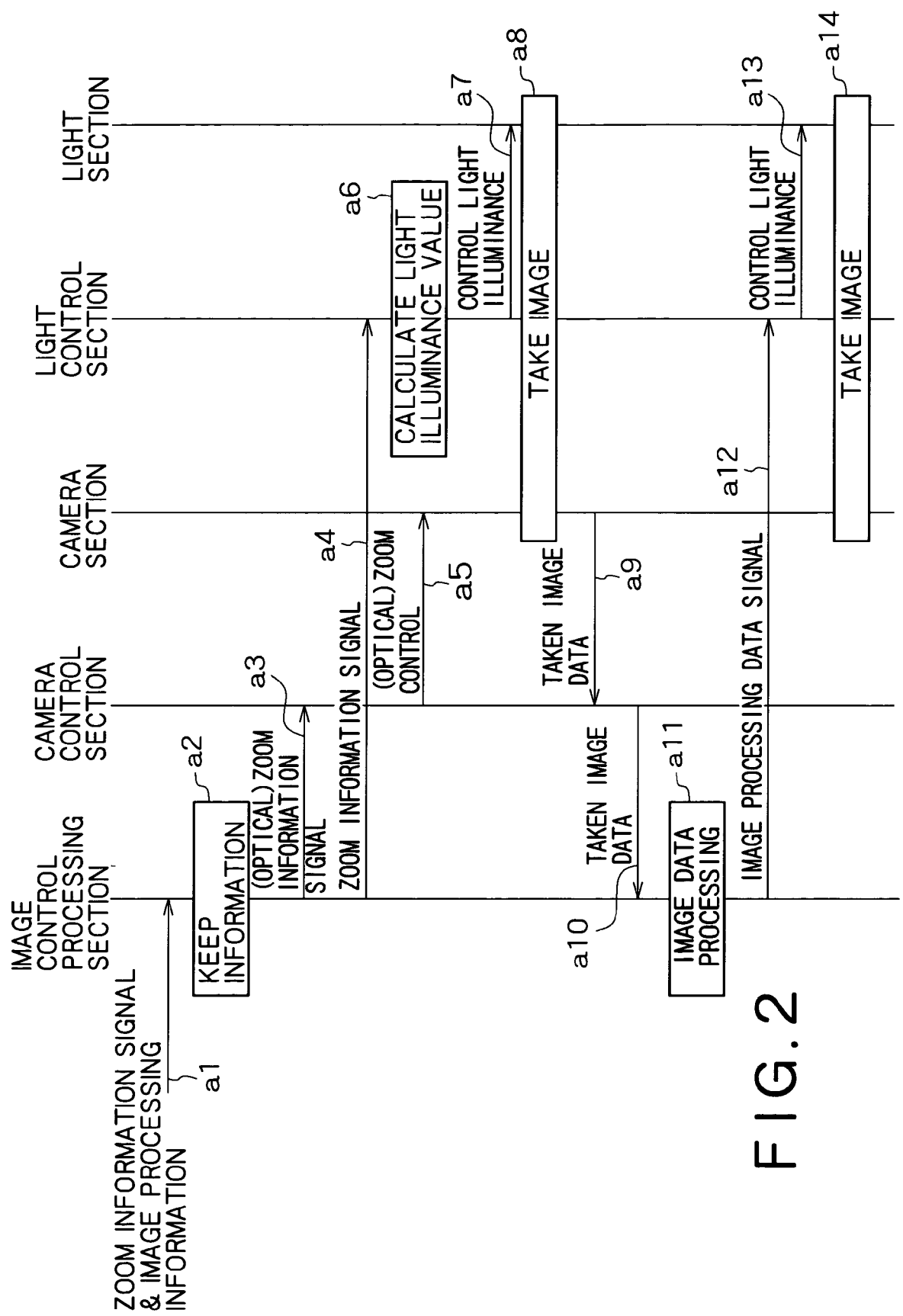
FIG. 2 is a sequence chart showing the operation of each part of the portable terminal device of FIG. 1.

FIG. 2 is a sequence chart showing the operation of each part of the portable terminal device 1 of FIG. 1. The operation of each part of the portable terminal device 1 according to the embodiment of the present invention will be described with reference to FIGS. 1 and 2.

First, the image control processing section 11 keeps signals corresponding to the zoom information and the image processing information (a1 and a2 of FIG. 2). The zoom information is a control signal corresponding to an optical zoom value and a digital zoom value operated by a user and the like. In this embodiment, the light illuminance is varied in accordance with a distance from the device to an object based on the zoom information.

The image processing information, on the other hand, is a control signal in a case where, for example, the brightness and sharpness of the image are converted into numerical values (with using threshold values of the length and the number of edges as parameters), and the numerical values are set at 3 on a scale from 1 to 5.

The image control processing section 11 sends the zoom information (zoom value) to each of the camera control section 14 (in the case of the optical zoom) and the light control section 12, based on the kept zoom information (a3 and a4 of FIG. 2). The camera control section 14 controls the camera section 15 in accordance with the received zoom value (a5 of FIG. 2).

The light control section 12, on the other hand, carries out illuminance control on the light section 13 in accordance with the zoom value with referring to a table (not illustrated) (a6 and a7 of FIG. 2). An image is taken in this state (a8 of FIG. 2).

Furthermore, the image control processing section 11 analyzes taken image data sent from the camera section 15 and the camera control section 14 (a9 to all of FIG. 2), and keeps data related to image processing. Image processing data is sent to the light control section 12 (a12 of FIG. 2).

The light control section 12 varies the illuminance in accordance with image processing data (a13 of FIG. 2), and an image is taken again in that state (a14 of FIG. 2). Here, varying the illuminance in accordance with image processing data further corrects the variation in the illuminance already made on the basis of the zoom value.

In this embodiment, as described above, the illuminance is widely varied in accordance with the zoom information, and then is corrected in accordance with the image processing information, in order to carry out light control appropriate to the distance from the device to the object. This processing operation is repeated, whenever a user newly sets the zoom information or the image processing information.

Figure 3:
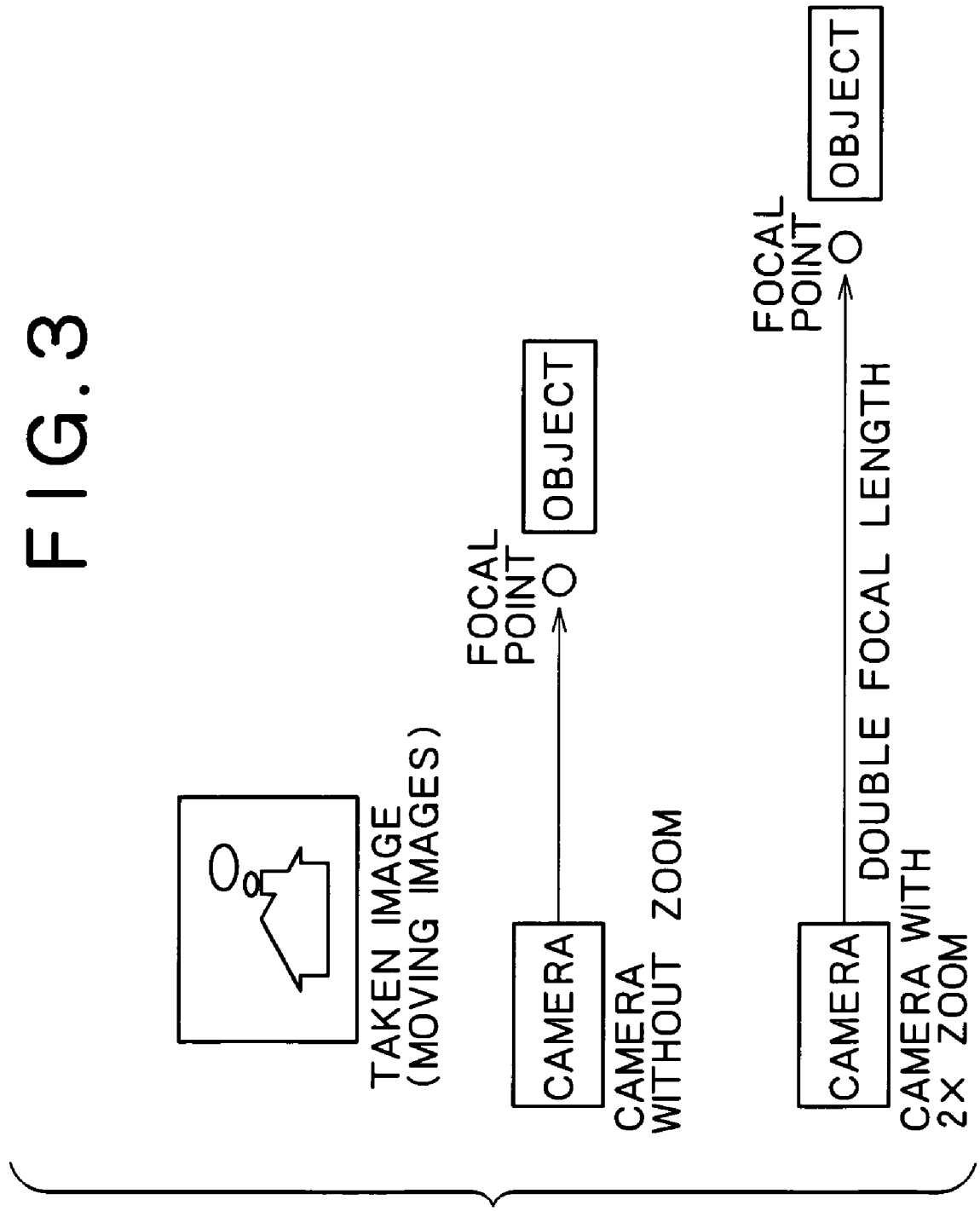
FIG. 3 is an explanatory view for explaining the operation of taking an image by use of a zoom function of a camera section of FIG. 1.
Figure 4:
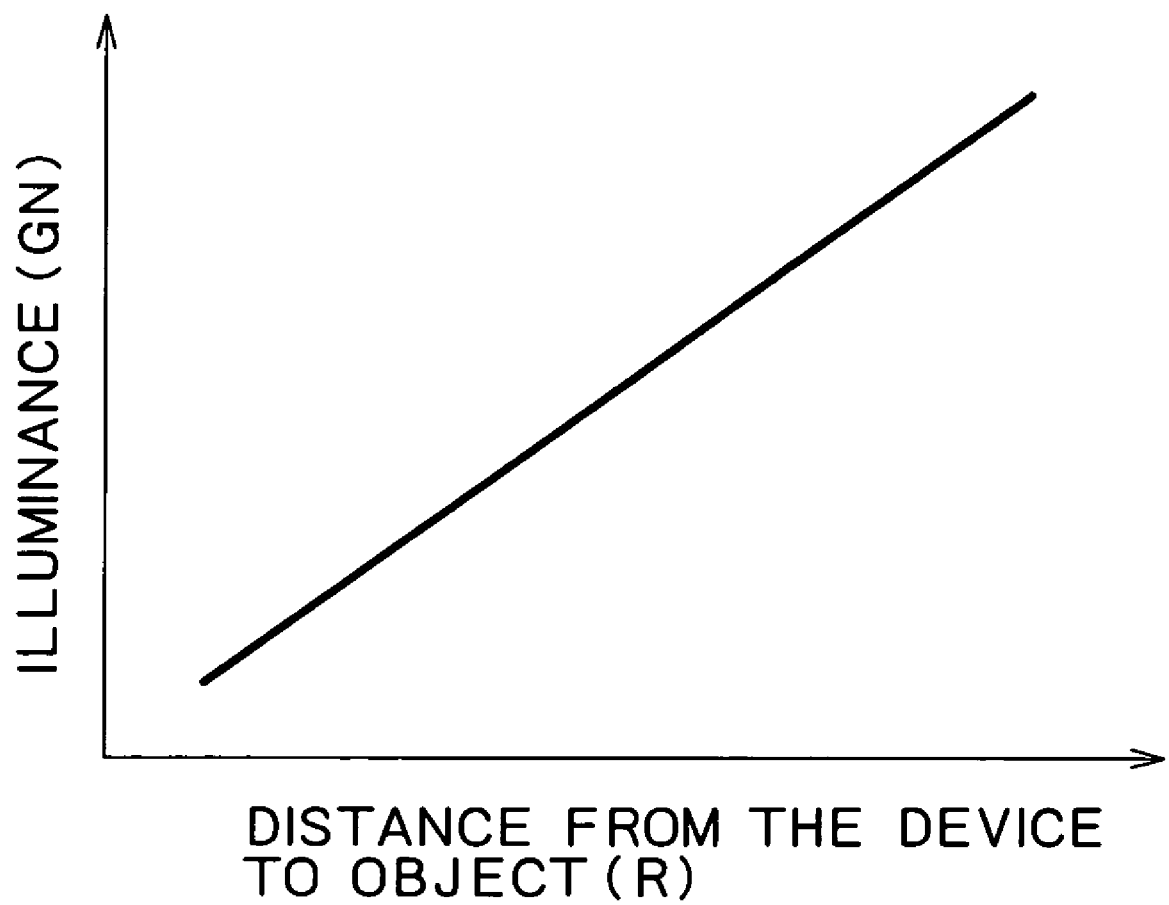
FIG. 4 is a graph showing the relation between distance from the device to an object and illuminance.
Figure 5:
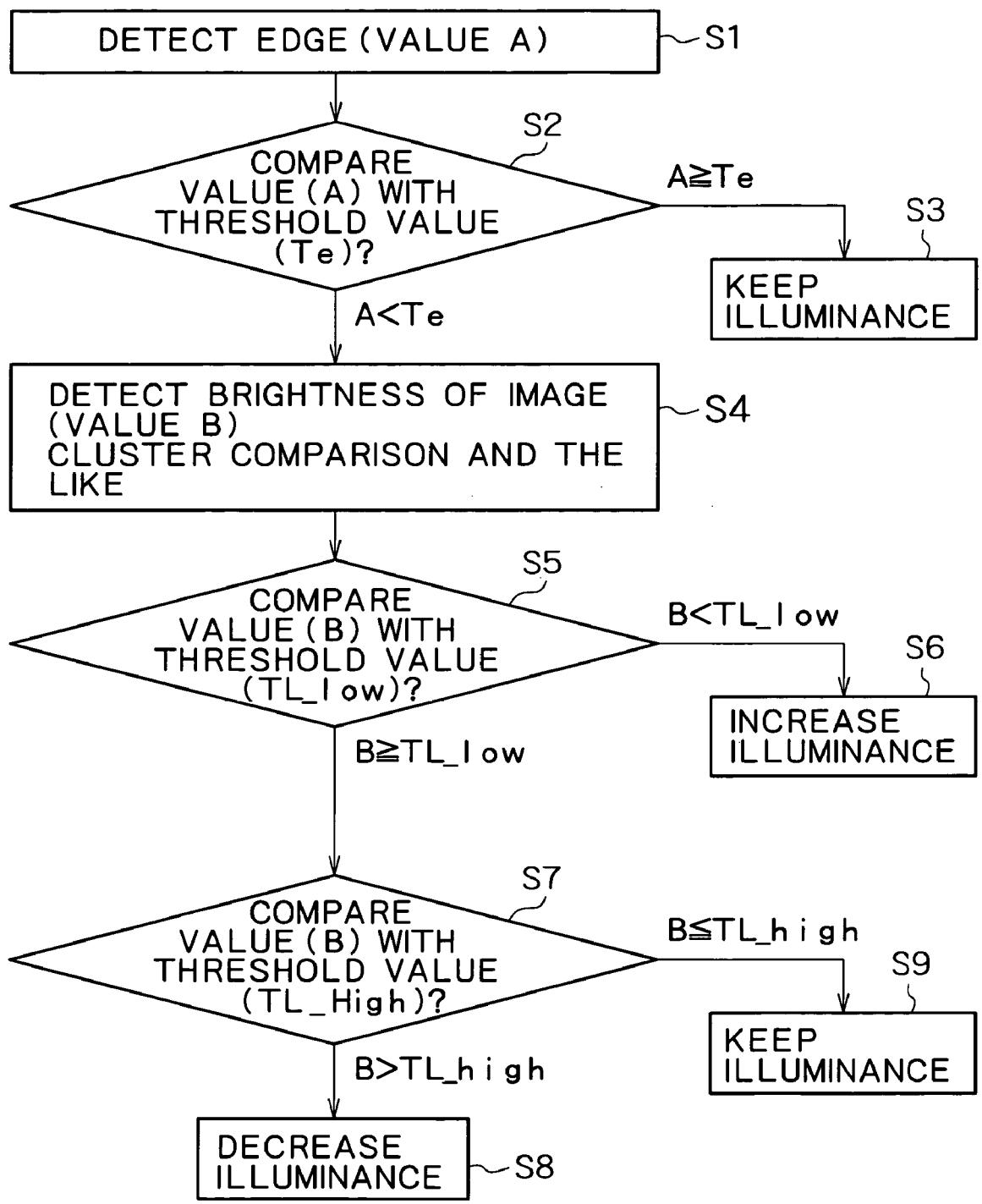
FIG. 5 is a flow chart showing the operation of a light control section of FIG. 1.

FIG. 3 is a view for explaining the operation of taking an image by use of a zoom function of the camera section 15 of FIG. 1. FIG. 4 is a graph showing the relation between the distance from the device to the object and the illuminance, and FIG. 5 is a flow chart showing the operation of the light control section 12 of FIG. 1. The operation of the light control section 12 in accordance with data (the zoom information and the image processing information) sent from the image control processing section 11 to the light control section 12 will be described with reference to FIGS. 1 to 5. The operation shown in FIG. 5 is realized when the light control section 12 executes the program stored in the recording medium 16.

First, the zoom information will be described. Generally, the focal length of photography actually changes in the optical zoom function, and the value thereof is determined in each camera (lens) (for example, 2× optical zoom, 3× optical zoom and the like). FIG. 3 shows an image photographed in an original position without zoom. When an object twice away from the original position is photographed by use of a 2× zoom, an image similar to that of FIG. 3 is obtained.

Zooming, however, changes a focal length. To take an image having the same brightness as that without the zooming, it is necessary to, for example, double the illuminance. Since it can be considered that the zooming is in conjunction with distance from the device to the object, as described above, varying the light illuminance in accordance with a zoom ratio makes it possible to vary the illuminance in accordance with the distance from the device to the object.

Taking a case of a single-lens reflex camera, for example, though it is slightly different from the light section 13 of the portable terminal device 1, the proper intensity of light (GN) is determined by an f-number (F) for adjusting an amount of light entering a lens aperture, and distance (R) from the camera to a object. The relation is expressed as follows:

$$GN = F \times R$$

If the f-number is fixed in the portable terminal device 1, the relation between the distance from the device to the object and the illuminance for taking an image of proper brightness is shown in FIG. 4. In the light control section 12, an illuminance value is determined by the inclination (coefficient of "a") of a straight line shown in FIG. 4 and the zoom value sent from the image control processing section 11.

Then, the image processing information will be described. In the image control processing section 11, the taken image is objected to the image processing (for example, edge detection, cluster comparison and the like after being converted into a gray image), and obtained image processing data is compared with and judged by the information (threshold values) kept in advance.

The light control section 12 adjusts the light illuminance based on judgment results from the image control processing section 11. As shown in FIG. 5, when the value (A) of an edge portion is smaller than a predetermined threshold value (Te) (A<Te) (steps S1 and S2 of FIG. 5), and the image has many dark areas on the whole (the value B of brightness of the image<a threshold value TL_low) (steps S4 and S5 of FIG. 5), for example, the illuminance is increased (step S6 of FIG. 5).

When the value (A) of the edge portion, on the other hand, is smaller than the predetermined threshold value (Te) (A<Te) (steps S1 and S2 of FIG. 5), and the image has many bright areas on the whole (the value B of brightness of the image>a threshold value TL_high) (step S7 of FIG. 5), the too intense illuminance makes the image hard to see, so that the illuminance is decreased (step S8 of FIG. 5). This image processing control is repeated in order of taking an image, subjecting the image to image processing, and varying the illuminance, until the judgments by the threshold values give O.K. [a flow is leaded into "keep illuminance" (steps S3 and S9 of FIG. 5)].

According to this function, if an image out of the threshold values is taken, in other words, even if the brightness of the image the illuminance of which is varied in accordance with zooming is poor for photography, or the variation in the illuminance in accordance with the zooming is improper for photography (for example, too intense), it is possible to ensure proper illuminance, by which the taken image processing values become within the threshold values. Image correction is carried out more finely by dividing the threshold values into finer stages.

The image control processing section 11 sends the image processing value to the light control section 12. The light control section 12 varies the illuminance in accordance with the image processing value ("up," "down," or "keep"). Any value "b" is available as the step of variation in the illuminance (from a minimum variable step to the variation step of illuminance in accordance with a zoom ratio).

The light control section 12 controls the light section 13 on the basis of the signals sent from the image control processing section 11. Taking a case where the zoom ratio is set at 3×, for example, if a normal value is set at 1, the illuminance of the light section 13 is determined by the following equation:

Light illuminance=3×$a$

Then, if the judgments by the threshold values give O.K. in the image processing, the illuminance is unchanged. When the image processing value of "down" is sent to the light control section 12 at three times, the illuminance is changed as follows:

Light illuminance=(3×$a$)+(−3×$b$)

According to this embodiment, as described above, the illuminance of the light is automatically varied in accordance with the distance from the device to the object even in a bright location, in addition to the light control in a dark location. By controlling the illuminance on the basis of two factors of the zoom value and the image processing value, an error in the variation of the illuminance in accordance with the zoom value can be corrected, so that it becomes possible for a user to make the light illuminance appropriate to the photographic conditions.

What is claimed is:

1. A portable terminal device comprising:
   a camera module;
   a light module as an illumination function in shooting an image of an object by the camera module;
   an image control processing section for sending zoom control information of the camera module and carrying out image processing; and
   an illuminance variable section for varying illuminance intensity output from the light module in accordance with a determined distance from the camera module to the object,
   wherein the illuminance variable section further varies the illuminance intensity output for photography of the light module in accordance with information on the image processing of an immediately preceding taken image.

2. The portable terminal device according to claim 1, wherein the determined distance is based on a zoom ratio of the camera module.

3. A method for varying light illuminance of a portable terminal camera device, the method comprising:
   an illuminance variable step of varying illuminance intensity output from a light module of a portable terminal camera device in accordance with a determined distance from the portable terminal camera device to an object to be captured,
   wherein the illuminance variable step further varies the illuminance intensity output for photography of the light module in accordance with information on image processing results of an immediately preceding taken image.

4. The method for varying light illuminance according to claim 3, wherein the determined distance is based on a zoom ratio of the portable terminal camera device.

5. A recording medium storing a program of instructions executable by a computer to control the computer to function for varying light illuminance intensity output from a portable terminal device, the program making the computer carry out processing which varies illuminance intensity output from a camera light module in accordance with a determined distance from the portable terminal device to an object to be captured,
   wherein the program causes the computer to i) determine the distance between the portable terminal device and the object; and ii) send the determined distance as distance information to an illuminance variable section in order that the illuminance intensity output from the camera light module is varied in accordance with the thus determined distance,
   wherein the determined distance is based on a zoom ratio of the portable terminal device, and
   wherein the program causes the computer to further vary the illuminance intensity output during photo exposure in accordance with information on image processing, said information including shades and outlines of an image to be photographed.

6. A portable terminal device comprising:
   a camera module;
   a light module as an illumination function in shooting an image of an object by the camera module;
   an image control processing section for sending zoom control information of the camera module and carrying out image processing; and
   an illuminance variable section for varying illuminance intensity output from the light module in accordance with a determined distance from the camera module to the object,
   wherein the determined distance is based on a zoom ratio of the camera module, and
   wherein the illuminance variable section further varies the illuminance intensity output during photo exposure in accordance with information on the image processing, said information including shades and outlines of an image to be photographed.

7. A method for varying light illuminance of a portable terminal camera device, the method comprising:
   an illuminance variable step of varying illuminance intensity output from a light module of a portable terminal camera device in accordance with a determined distance from the portable terminal camera device to an object to be captured, wherein the illuminance variable step further varies the illuminance intensity output during photo exposure in accordance with information on the image processing, said information including shades and outlines of an image to be photographed.

8. A recording medium storing a program of instructions executable by a computer to control the computer to function for varying light illuminance intensity output from a portable terminal device, the program making the computer carry out processing which varies illuminance intensity output from a camera light module in accordance with a determined distance from the portable terminal device to an object to be captured, wherein the program causes the computer to i) determine the distance between the portable terminal device and the object; and ii) send the determined distance as distance information to an illuminance variable section in order that the illuminance intensity output from the camera light module is varied in accordance with the thus determined distance, wherein the determined distance is based on a zoom ratio of the portable terminal device, and wherein the program causes the computer to further vary the illuminance intensity output during photo exposure in accordance with information on image processing, said information including edge detection of an image to be photographed.

9. A portable terminal device comprising:

a camera module;

a light module as an illumination function in shooting an image of an object by the camera module;

an image control processing section for sending zoom control information of the camera module and carrying out image processing; and an illuminance variable section for varying illuminance intensity output from the light module in accordance with a determined distance from the camera module to the object, wherein the determined distance is based on a zoom ratio of the camera module, and wherein the illuminance variable section further varies the illuminance intensity output during photo exposure in accordance with information on the image processing, said information including edge detection of an image to be photographed.

10. A method for varying light illuminance of a portable terminal camera device, the method comprising:

an illuminance variable step of varying illuminance intensity output from a light module of a portable terminal camera device in accordance with a determined distance from the portable terminal camera device to an object to be captured, wherein the illuminance variable step further varies the illuminance intensity output during photo exposure in accordance with information on the image processing, said information including edge detection of an image to be photographed.

11. A computer readable recording medium storing a program of instructions executable by a computer to control the computer to function for varying light illuminance intensity output from a portable terminal device, the program making the computer carry out processing which varies illuminance intensity output from a camera light module in accordance with a determined distance from the portable terminal device to an object to be captured, wherein the program causes the computer to i) determine the distance between the portable terminal device and the object; and ii) send the determined distance as distance information to an illuminance variable section in order that the illuminance intensity output from the camera light module is varied in accordance with the thus determined distance, wherein the determined distance is based on a zoom ratio of the portable terminal device, and wherein the program causes the computer to further vary the illuminance intensity output during photo exposure in accordance with information on image processing, said information including cluster comparison of an image to be photographed.

12. A portable terminal device comprising:

a camera module;

a light module as an illumination function in shooting an image of an object by the camera module;

an image control processing section for sending zoom control information of the camera module and carrying out image processing; and an illuminance variable section for varying illuminance intensity output from the light module in accordance with a determined distance from the camera module to the object, wherein the determined distance is based on a zoom ratio of the camera module, and wherein the illuminance variable section further varies the illuminance intensity output during photo exposure in accordance with information on the image processing, said information including cluster comparison of an image to be photographed.

13. A method for varying light illuminance of a portable terminal camera device, the method comprising:

an illuminance variable step of varying illuminance intensity output from a light module of a portable terminal camera device in accordance with a determined distance from the portable terminal camera device to an object to be captured, wherein the illuminance variable step further varies the illuminance intensity output during photo exposure in accordance with information on the image processing, said information including cluster comparison of an image to be photographed.

* * * * *